(12) United States Patent
McDaniel et al.

(10) Patent No.: US 8,542,585 B2
(45) Date of Patent: *Sep. 24, 2013

(54) METHOD AND SYSTEM FOR TRANSMIT SCHEDULING FOR MULTI-LAYER NETWORK INTERFACE CONTROLLER (NIC) OPERATION

(75) Inventors: Scott McDaniel, Villa Park, CA (US); Kan Frankie Fan, Diamond Bar, CA (US); Uri El Zur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/205,862

(22) Filed: Aug. 9, 2011

(65) Prior Publication Data

US 2011/0307577 A1    Dec. 15, 2011

Related U.S. Application Data

(63) Continuation of application No. 11/013,659, filed on Dec. 16, 2004, now Pat. No. 8,009,563.

(60) Provisional application No. 60/531,056, filed on Dec. 19, 2003.

(51) Int. Cl.
*H04J 1/16* (2006.01)
*H04L 12/56* (2011.01)

(52) U.S. Cl.
USPC ............ 370/230; 370/235; 370/253; 370/412

(58) Field of Classification Search
None
See application file for complete search history.

(56) References Cited

U.S. PATENT DOCUMENTS

| | | | |
|---|---|---|---|
| 5,541,922 A * | 7/1996 | Pyhalammi | 370/462 |
| 5,850,398 A | 12/1998 | King, Jr. | |
| 6,327,271 B1 * | 12/2001 | Gotesman et al. | 370/474 |
| 6,327,625 B1 * | 12/2001 | Wang et al. | 709/235 |
| 6,747,949 B1 * | 6/2004 | Futral | 370/231 |
| 6,791,947 B2 * | 9/2004 | Oskouy et al. | 370/238 |
| 6,836,479 B1 | 12/2004 | Sakamoto et al. | |
| 6,842,423 B1 | 1/2005 | Erimli et al. | |
| 6,888,830 B1 | 5/2005 | Snyder, II et al. | |

(Continued)

FOREIGN PATENT DOCUMENTS

WO    03105011 A    12/2003

OTHER PUBLICATIONS

European Search Report for Application No. 04030181.4 dated Apr. 5, 2005.

*Primary Examiner* — Melanie Jagannathan
(74) *Attorney, Agent, or Firm* — Thomas|Horstemeyer LLP.

(57) ABSTRACT

A method for processing network data includes collecting by a network interface controller (NIC), a plurality of transmit (TX) buffer indicators into a plurality of priority lists of connections. Each of the plurality of TX buffer indicators identifies transmit-ready data located externally to the NIC and not previously received by the NIC. One or more of the plurality of TX buffer indicators may be selected. The identified transmit-ready data may be retrieved into the NIC based on the selected one or more of the plurality of TX buffer indicators. At least a portion of the identified transmit-ready data may be transmitted. Each of the plurality of priority lists may be generated based on a particular connection priority characteristic and a particular connection type. The identified transmit-ready data may be associated with the same connection priority characteristic and the same connection type.

45 Claims, 9 Drawing Sheets

(56) References Cited

U.S. PATENT DOCUMENTS

| | | |
|---|---|---|
| 6,938,097 B1 * | 8/2005 | Vincent et al. ............... 709/240 |
| 6,975,638 B1 | 12/2005 | Chen et al. |
| 6,993,041 B2 | 1/2006 | Yamamoto |
| 7,126,959 B2 | 10/2006 | Van Asten et al. |
| 2002/0062333 A1 * | 5/2002 | Anand et al. ............... 709/105 |
| 2003/0165160 A1 | 9/2003 | Minami et al. |

\* cited by examiner

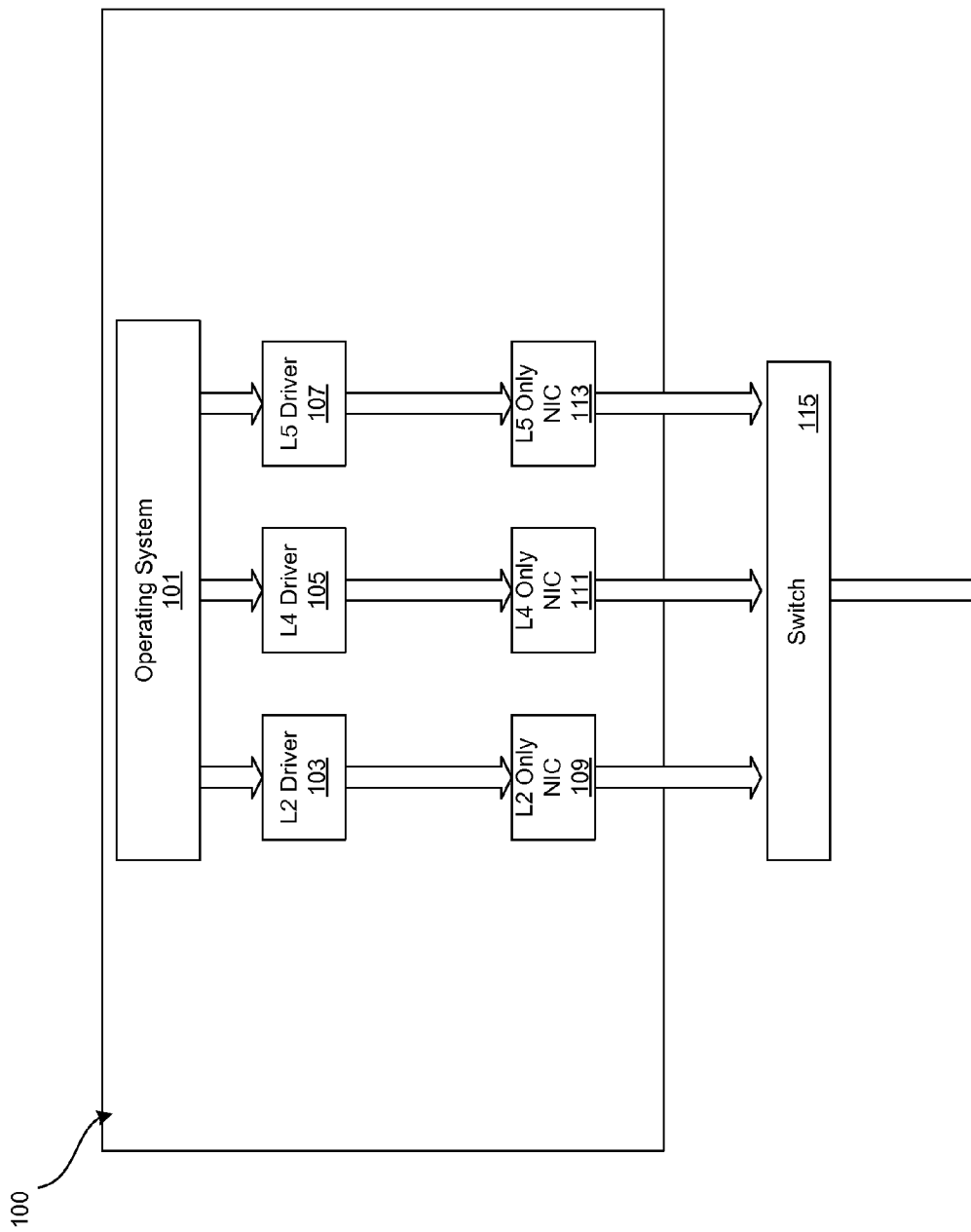

METHOD AND SYSTEM FOR TRANSMIT SCHEDULING FOR MULTI-LAYER NETWORK INTERFACE CONTROLLER (NIC) OPERATION

CROSS-REFERENCE TO RELATED APPLICATIONS/INCORPORATION BY REFERENCE

This application is a continuation of U.S. application Ser. No. 11/013,659 filed Dec. 16, 2004, which in turn makes reference to, claims priority to and claims the benefit of U.S. States Provisional Patent Application Ser. No. 60/531,056 filed on Dec. 19, 2003 and entitled "Transmit Scheduling Method for Multi-Layer Network Interface Card (NIC) Operation."

The above stated application is incorporated herein by reference in its entirety.

FIELD OF THE INVENTION

Certain embodiments of the invention relate to network interface processing, More specifically, certain embodiments of the invention relate to a method and system for transmit scheduling for multi-layer network interface controller (NIC) operation,

BACKGROUND OF THE INVENTION

The International Standards Organization (ISO) has established the Open Systems Interconnection (OSI) reference model. The OSI reference model provides a network design framework allowing equipment from different vendors to be able to communicate. More specifically, the OSI reference model organizes the communication process into seven separate and distinct, interrelated categories in a layered sequence, Layer 1 (L1) is the Physical Layer, which handles the physical means of sending data. Layer 2 (L2) is the Data Link Layer, which is associated with procedures and protocols for operating the communications lines, including the detection and correction of message errors. Layer 3 (L3) is the Network Layer, which determines how data is transferred between computers, Layer 4 (L4) is the Transport Layer, which defines the rules for information exchange and manages end-to-end delivery of information within and between networks, including error recovery and flow control. Layer 5 (L5) is the Session Layer, which deals with dialog management and controlling the use of the basic communications facility provided by Layer 4. Layer 6 (L6) is the Presentation Layer, and is associated with data formatting, code conversion and compression and decompression. Layer 7 (L7) is the Applications Layer, and addresses functions associated with particular applications services, such as file transfer, remote file access and virtual terminals In some communication systems, network interface controllers (NICs) may be required to support multiple interfaces to a host system that may be running with a plurality of different levels of offload. The host system interfaces may include legacy L2 services, transport level L4 services, or session level L5 services. For the legacy L2 services, the NIC provides a lower amount of offload where pre-formatted packets from the system are simply read from the system and transmitted. For the transport level L4 services, the NIC provides reliable data transport service on a connection by connection basis. A normal implementation of this type of offload includes TCP/IP offload. For session level L5 services, the NIC provides upper level protocol L5 services in which the NIC provides protocol specific services, such as digest or header composition/decomposition, as well as protocol specific or generic buffer-to-buffer copy services across the network with reliable data transport. A typical implementation of this type of offload is RDMAC protocol or iSCSI protocol.

FIG. 1A is a block diagram of a conventional system 100 that may be required to support multiple interfaces to a host system that may be running with a plurality of different levels of offload. Referring to FIG. 1A, the system 100 may comprise operating system 101, L2 driver 103, L4 driver 105, L5 driver 107, L2 only NIC 109, L4 only NIC 111, L5 only NIC 113, and external switch 115. The system 100 may utilize operating system 101 to support L2, L4 and L5 types of offload. The operating system 101 may utilize separate drivers and separate NICs for each type of offload. For example, L2 type of offload may be managed by a L2 NIC 109 utilizing a L2 driver 103, L4 type of offload may be managed by a L4 MC 111 utilizing a L4 driver 105, and L5 type of offload may be managed by a L5 MC 113 utilizing a L5 driver 107.

The conventional system 100 is a multiple support environment in which each of the offload layer protocols is implemented on a separate NIC or Host Bus Adapter (HBA). Since each of the offload layer protocols is implemented on a separate NIC, there is little need to manage the transmit bandwidth between the different levels of services. Each NIC has its own independent connection to the network,. For example, it may be a common occurrence for some or all of the protocols for the L2 MC 109, the L4 NIC 111 and the L5 NIC 113 to be simultaneously transmitting. In this regard and when all the NICs transmit on the same network (e.g. Ethernet) and that network transfers all of the above data types form the multiple NICs to the destination's, such solution may utilize a single external switch 115 to combine traffic on a per-packet basis (directly attached or somewhere between source and destination). Each NIC in this solution may not take the traffic needs of adjacent NIC devices into account. Consequently, if all three NIC devices transmit at a combined rate greater than a designated egress port, leading towards the destination on the switch 115, data may accumulate inside the switch and packets from two or more of the MC devices may be delayed or even dropped regardless of protocol type, connection priority characteristic, or protocol element type. In addition, costs for power, cooling, and/or component costs, both within and outside the system, may be considerable.

A second problem may arise since all offloads of L4 and above must meter out the transmit bandwidth between many different connections. A latency sensitive connection having a small amount of data to transmit, may have to wait until busier connections are idle before the connection with the small amount of data is allowed to transmit. Furthermore, busy connection(s) may operate for long periods and the small connections with sparse amounts of traffic may not be permitted to transmit until the busy connections have become idle. This may occur because system performance is normally sensitive to throughput for high bandwidth connections while latency is important for connections with a sparse amount of traffic, or because the system may have a policy of sending all the data available for a connection or very large blocks of data per connection.

In addition, offload NICs may nowadays transmit data faster than it was previously possible. One problem with this acceleration is that it is more important to keep the accelerated NIC transmitter updated as to the buffer status on the receiving NIC. For the TCP protocol, for example, the receiver window size may normally be enlarged, by configuration or other, when the network speed is increased. The receiver, therefore, must provide buffering for receive data up to the size of the TCP send window. This may require more costly memory either in the offload NIC or in the host of the receiver, to achieve the higher throughput.

FIG. 1B is a diagram illustrating transmit behavior characteristic of the system of FIG. 1A. Referring to FIG. 1B, there is shown a connection A 121, a connection B 123 and a transmit behavior 125 for connections 121 and 123 when an external switch is utilized. Connection A, 121, may have a small amount of data to occasionally transmit and connection B, 123, may have a large amount of data to transmit. In the conventional system 100 of FIG. 1A, the transmit behavior 125 may correspond to a transmit pattern when an external switch is utilized to switch between connections A 121 and B 123. Since the large data transmit of connection B 123 may be broken up into individual packets, a switch, such as the switch in the conventional system 100 of FIG. 1A, may be utilized for limiting delay incurred by connection A 121. In this regard, packetized data streams may be merged after they have been packetized by the independent NICs.

FIG. 1C is a diagram illustrating data transmit and acknowledgement receive behavior characteristics of the system of FIG. 1A. Referring to FIG. 1C, transmit data traffic may be represented by transmit connections 131, 137, and 143. Corresponding receive acknowledgements may be represented by receive connections 133, 139, and 145. Bandwidth window size for each of the transmit data connections 131, 137, and 143 may be represented by bandwidth window sizes 135, 141, and 147, respectively. With regard to each of the three connections 131, 137, and 143, the transmitter must have "credit" to transmit packets This credit may be equal to the amount of memory that the receiver has dedicated for this connection to receive data into. The amount of credit available is referred to as "window size" in TCP. The transmitter may transmit up to the available credit, but then must wait for acknowledges from the receiver which may restore some credit level before continuing. The receiver may be adapted to restore credit for data that has been properly received and/or processed by transmitting acknowledges 133, 139, and/or 145.

The first set of transmit data connection 131 and receive acknowledges 133 illustrates behavior at traditional speeds. A receiver may promptly generate acknowledges 133 about every two packets and may communicate the acknowledges 133 within one large packet time. As a result, a minimum possible bandwidth window size 135, that may be utilized to achieve full bandwidth, may be well controlled. The second set of transmit data connection 137 and receive acknowledges 139 illustrates packet processing behavior as the network communicates faster and not with the same scale as the first transmit-receive set. The receiver in this case is promptly generating acknowledges 139, however, the generated acknowledges may take longer time to transition the network as before. In the same amount of time, much more data may be transmitted, so the receiver may need to be configured with a larger window, which is bigger than the minimum possible bandwidth window 141 to achieve full bandwidth. To achieve full bandwidth, the window size may be configured at an increased size, which may be equal to, or larger than, the minimum possible window size 141. The increased window size may consume more receiver memory. However, the increased window size may be utilized to compensate for network latency and to achieve full bandwidth.

The third set of transmit data connection 143 and receive acknowledges 145 illustrates packet processing behavior when the receiver's transmitter is characterized with poor TX scheduling behavior. In this case, the acknowledges 145 may be delayed due to waiting for transmission of some other connection, for example, and may emerge as a group later in time. Accordingly, the minimum bandwidth window size 147 that may be required to achieve full bandwidth, may be further impacted and significantly increased. If the window size is not adjusted to match or exceed the new minimum bandwidth window size 147, the transmitter may "stutter," or come to a full stop, waiting for more ACK from the receiver. Since the window size for any one connection is normally fixed in size, it is important that ACK transmit behavior be predictable to keep window size requirements to a minimum and to maintain full possible bandwidth. Further, if the window size is limited below the minimum required size for full bandwidth, the possible bandwidth of the connection may be reduced. Any additional delay in generation of ACK packets, therefore, may further reduce the connection bandwidth, Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for transmitting data for network interface controller (NIC) applications. Aspects of the method may comprise collecting a plurality of transmit (TX) buffer indicators, each of which may identify transmit-ready data associated with at least one of a particular connection priority characteristic and a particular connection type. A TX buffer indicator may be selected and a portion of the transmit-ready data associated with the selected TX buffer indicator may be transmitted. The particular connection type may comprise a level 2 (L2) type, a level 4 (L4) type, and/or a level 5 (L5) type. If the particular connection type comprises L2 type, L4 type and/or L5 type, the plurality of TX buffer indicators may be prioritized into a priority list of connections with at least one of the particular connection priority characteristic. The priority list of connections may be prioritized based on at least one connection priority characteristic.

The priority list of connections may be utilized to elevate transmission priority of a TCP, or other transport or session layer, acknowledge (ACK) message and/or a protocol element. The priority list of connections may be utilized to limit transmission bandwidth dedicated to a type of traffic and/or a protocol element,. One or more of the TX buffer indicators may be selected via a weighted round robin scheme One or more of the TX buffer indicators may be associated with context information. The priority list of connections may be utilized to guarantee low latency transmission to a type of traffic, a connection, and/or a protocol element. The context information may comprise a TX ACK extent requirement and/or a maximum transmit-ready data size. If data size of the transmit-ready data is greater than the maximum transmit-ready data size, the transmit-ready data may be segmented into a plurality of transmit-ready data segments, where each of the transmit-ready data segments may be smaller than the maximum transmit-ready data size. Transmit-ready data segments of a particular connection type may be transmitted. One or more of the transmit-ready data segments may be separated by transmit-ready data from a connection associated with at least one of the particular connection priority characteristic and the particular connection type.

In another exemplary aspect of the invention, one or more active data connections of one or more types may be tracked on the NIC. One of the active connections may be selected for processing. The selected active data may be processed in at least one transmission processing block, where the transmission processing block may be capable of handling the plurality of active data connections for generation of transmit data stream from the NIC. A data stream may be selected for at least two transmission processing blocks for generation of the at least one transmit data stream from the NIC. A transmission arbitration system may be integrated with at least a portion of the transmission processing block, where an order of connection transmit processing may be determined at least partially within the transmit processing block.

Another aspect of the invention may be found in a machine-readable storage, having stored thereon, a computer program having at least one code section executable by a machine, thereby causing the machine to perform the steps as described above for transmitting data for network interface controller (NIC) applications.

Certain aspects of the system for transmitting data for network interface controller (NIC) applications may comprise at least one processor that collects transmit (TX) buffer indicators, each of which may identify transmit-ready data associated with a particular connection priority characteristic and/or a particular connection type. A TX buffer indicator may be selected by the processor. A portion of the transmit-ready data associated with the selected TX buffer indicator may be transmitted by the processor. The particular connection type may comprise a level 2 (L2) type, a level 4 (L4) type, and/or a level 5 (L5) type. If the particular connection type comprises L2 type, L4 type or L5 type, the TX buffer indicators may be prioritized by the processor into a priority list of connections with one or more of the particular connection priority characteristic.

The priority list of connections may be prioritized by the processor based on a connection priority characteristic. The priority list of connections may be utilized to elevate transmission priority of an acknowledge (ACK) message, a protocol element, and/or for guaranteed low latency traffic on a particular connection. The priority list of connections may be utilized to limit transmission bandwidth dedicated to a type of traffic and/or a protocol element. The TX buffer indicator may be selected via a weighted round robin scheme. The priority list of connections may be utilized to guarantee low latency transmission to a type of traffic, a connection, and/or a protocol element. The context information may comprise a TX ACK extent requirement and/or a maximum transmit-ready data size.

If data size of the transmit-ready data is greater than the maximum transmit-ready data size, the transmit-ready data may be segmented by the processor into transmit-ready data segments, where each of the transmit-ready data segments may be smaller than the maximum transmit-ready data size. The transmit-ready data segments of a particular connection type may be transmitted by the processor. One or more transmit-ready data segments may be separated by transmit-ready data from a connection in a different priority level set.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a block diagram of a conventional system that may be required to support multiple interfaces to a host system that may be running with a plurality of different levels of offload.

DETAILED DESCRIPTION OF THE INVENTION

Certain embodiments of the invention may be found in a method and system for transmit scheduling for multi-layer network interface controller (MC) operation. In one embodiment of the present invention, transmit (TX) buffer indicators may be generated, where each may identify transmit-ready data of a level 2 (L2) type, a level 4 (L4) type, and/or a level 5 (L5) type. A TX buffer indicator may be communicated from the driver to the NIC to indicate transmit-ready data. Each TX buffer indicator may contain the extent of data to transmit and may contain directly or by association a priority characteristic for the transmit operation, TX buffer indicators may be sorted and stored in a plurality of priority sets based on the priority characteristic. The priority characteristic may be configured based on TCP, or other transport or session layer acknowledge (ACK) message, and/or a protocol element. The priority characteristic may be configured based on connection requirements such as low latency or higher priority (e.g. IEEE 802.1P or IP TOS bits), or an indication from the operating system or from the driver or by use of a configuration utility. A TX buffer indicator may be selected based on the priority characteristic and a portion or all of the transmit-ready data associated with the TX buffer indicator may be transmitted. Inside each priority level, a weighted round robin scheme may be utilized to select a TX buffer indicator.

The transmit-ready indicator may be associated with context information, such as a TX ACK message type and/or a maximum transmit-ready data size and/or the receivers capability to receive data. If the transmit-ready data size is greater than the maximum transmit-ready data size, the transmit-ready data may be segmented into transmit-ready data segments such that each of the transmit-ready data segments is smaller than the maximum transmit-ready data size. The transmit-ready data segments for a particular connection type may be transmitted one after the other, or they may be separated, during transmission, by transmit-ready data or segments for different connection types. This segmentation is part of the invention, and un-related to the TCP or other protocol required packet segmentation requirements.

Figure 2:
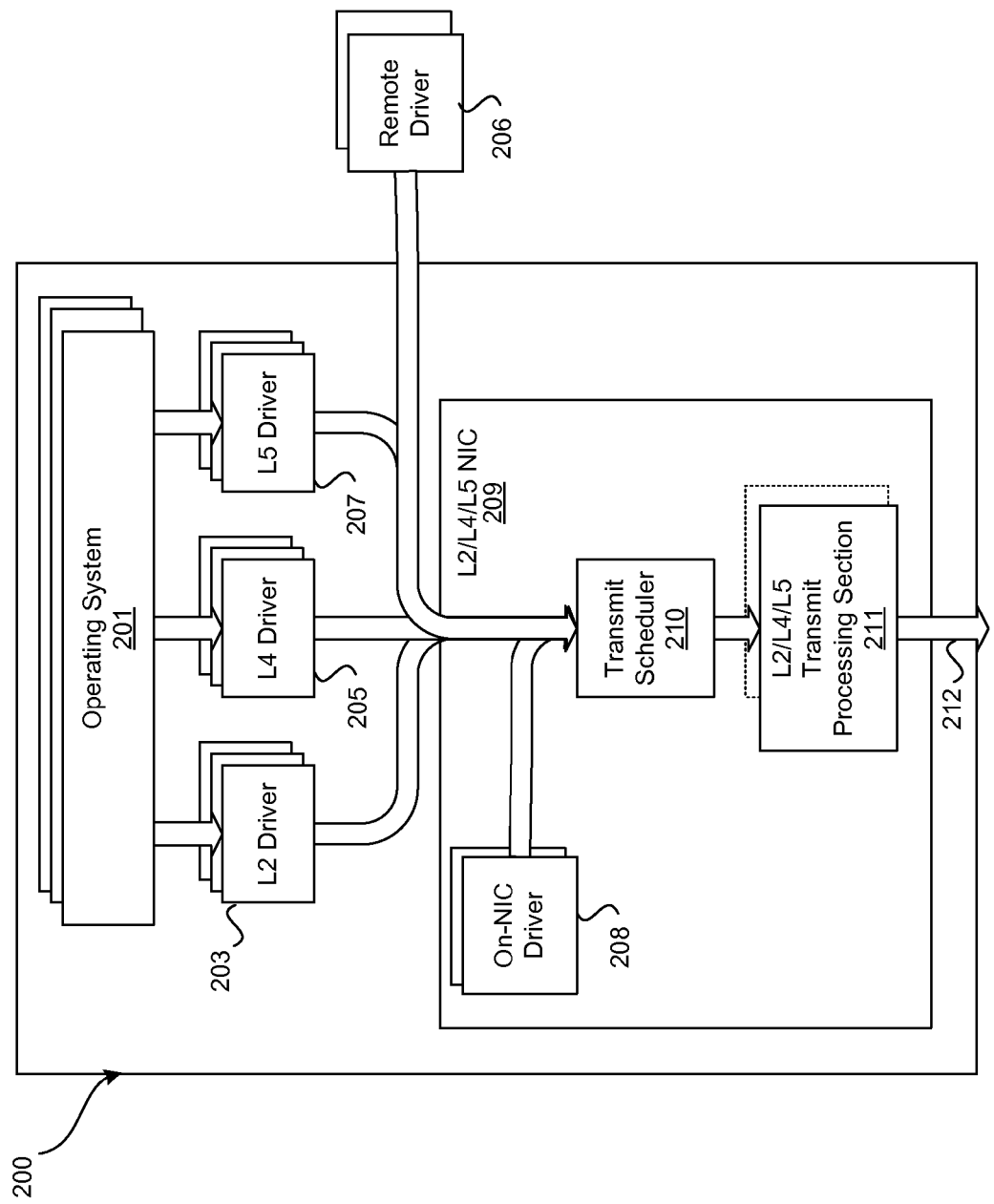
FIG. 2 is a diagram of a system with an optimized multilayer NIC implementation that may be utilized for delivering multilayer offload support to a single network connection, in accordance with an embodiment of the invention.

FIG. 2 is a diagram of a system 200 with an optimized multi-layer NIC implementation that may be utilized for delivering multi-layer offload support to a single connection, in accordance with an embodiment of the invention, Referring to FIG. 2, the system 200 may comprise an operating system 201, a plurality of L2 drivers 203, a plurality of L4 drivers 205, a plurality of L5 drivers 207, a plurality of remote drivers 206, and a L2 /L4/L5 NIC 209. The NIC 209 may comprise a transmit scheduler 210 and transmit processing section 211. In an exemplary aspect of the invention, the transmit processing section 211 may comprise a plurality of transmit processing sections. The system 200 may utilize operating system 201 to support L2, L4, and L5 types of offload. The operating system 201 may utilize the L2 drivers 203, the L4 drivers 205, and the L5 drivers 207 for each type of offload, respectively. The single NIC 209 may be adapted to manage all types of offload, including L2, L4, and/or L5 types of offloads, utilizing the common transmit processing section 211.

Figure 1B:
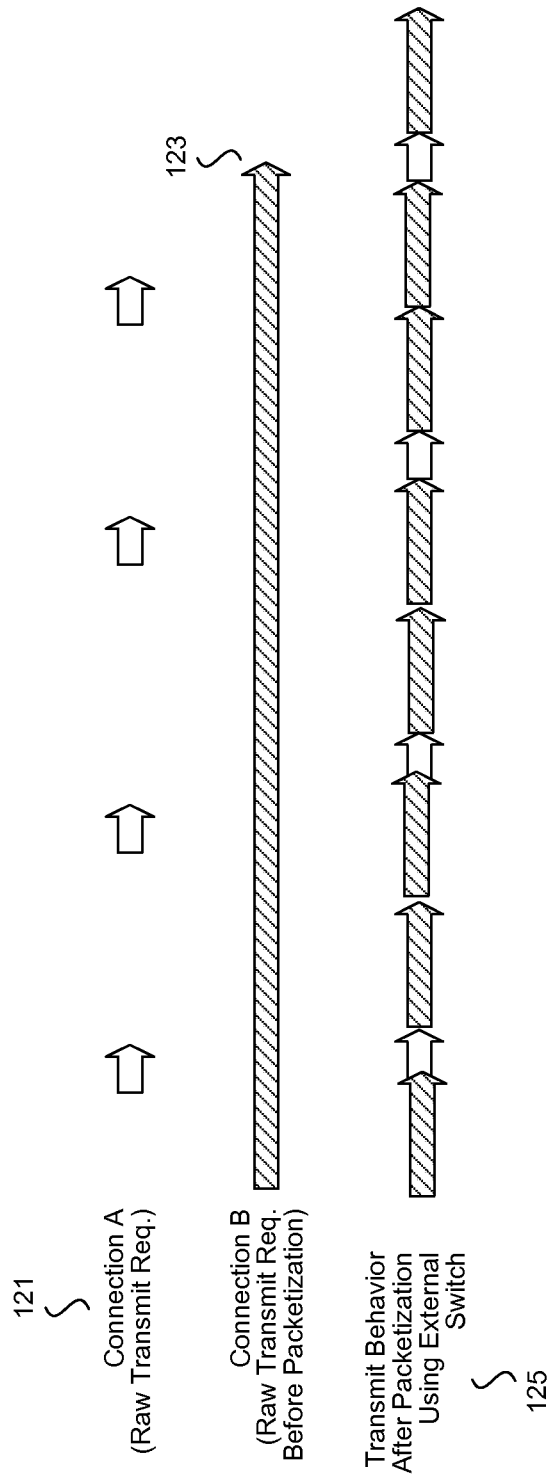
FIG. 1B is a diagram illustrating transmit behavior characteristic of the system of FIG. 1A.
Figure 1C:
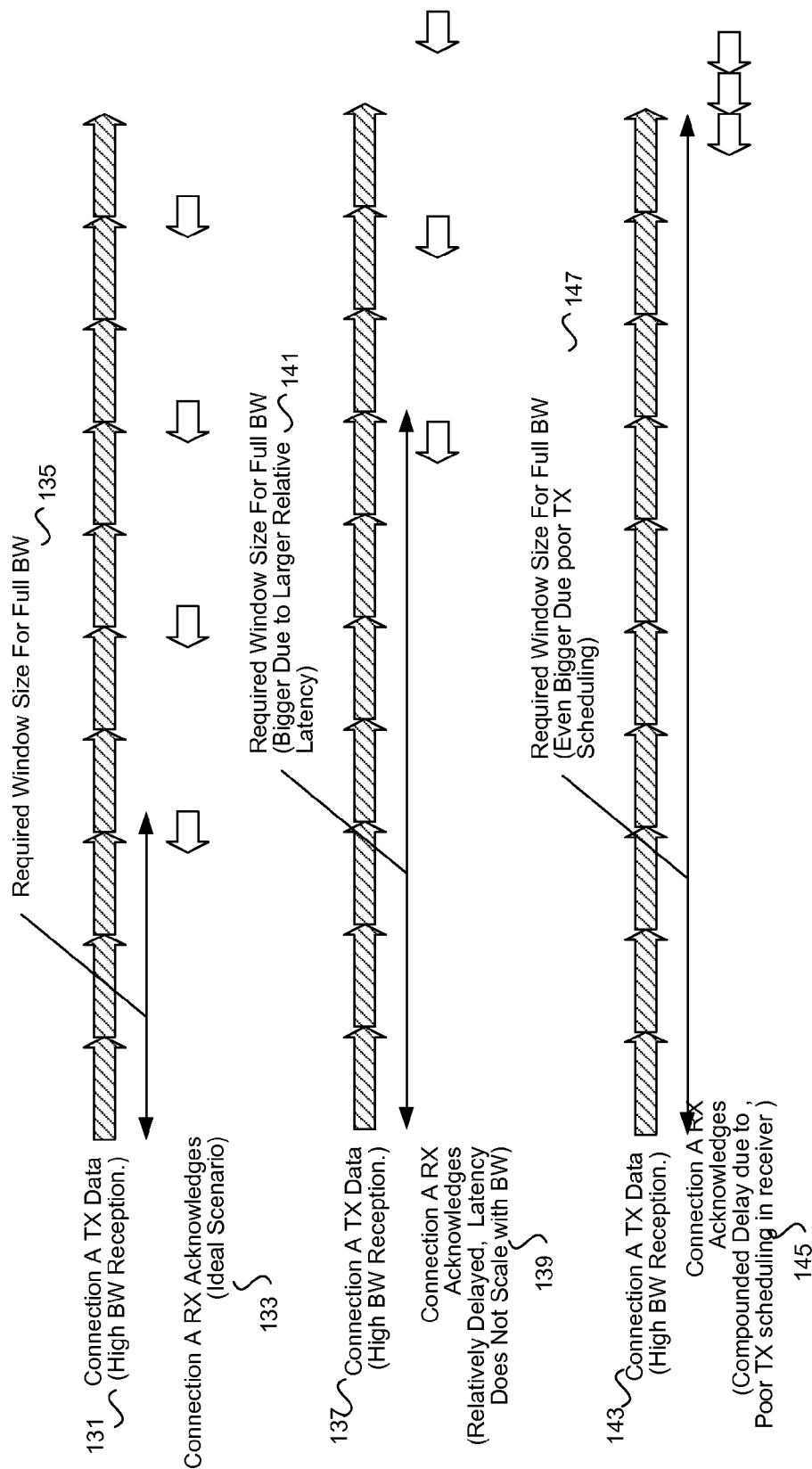
FIG. 1C is a diagram illustrating data transmit and acknowledgement receive behavior characteristics of the system of FIG. 1A.

The transmit processing section 211 may be implemented in a cost-efficient manner compared to prior-art described on FIG. 1A, where full data and control processing bandwidth may be provided for each offload type to handle all possible mixes of traffic required by an operating system. The data and control processing bandwidth of the system 200 may be matched to a network connection bandwidth to provide full network bandwidth for a plurality of transmit offloads or may be configured to any rate lower than the full bandwidth to facilitate avoiding congestion in a different point in the network, for example. This adjustment may be achieved for any connection or offload type, or for the NIC as a whole, By utilizing the transmit scheduler 210 and the transmit processing section 211, all data path and control path functions within the system 200 may be common between various offload processing functions since they never need to operate at the same time to maintain full bandwidth at the network connection 212. Any offload processing power in 211 not used by one type of offload may be utilized by a different offload. The operating system 201 may post transmit tasks for one or more offloads onto the NIC 209 via non-blocking paths through each of the drivers 203, 205, and/or 207. In addition to the operating system transmit task, an on-NIC driver 208, may comprise post-transmit tasks for one or more offloads. On-NIC drivers may comprise connections needed for on-NIC stacks, such as management stacks, or data connections to other elements in the system, such as system management or levels of offloads not covered by 203, 205 and 207, but provided by a different part of the NIC 209. On-NIC drivers may utilize any level of offload (L2 /L4/L5) that may be appropriate for the application.

In an exemplary aspect of the invention, another source of transmit tasks may comprise drivers located on remote or different systems from system 200. These remote drivers 206 may utilize similar or different communication channels from those used by the on-system drivers 203, 205, and/or 207, to communicate with the transmit scheduler 210. These remote drivers may use any level of offload appropriate for the application. As with the on-system drivers, a plurality of on-NIC or remote drivers may be utilized. In an embodiment of the present invention, the NIC 209 may comprise a multi-layer NIC and may utilize one or more functions for handling received multilayer NIC operations, such that the transmit operations may be handled on a one-at-a-time or on a pipelined basis by the single transmit processing section 211. The transmit scheduling function 210 may be utilized to order and modulate the transmit request tasks from the drivers 203, 205, 206, 207, and 208.

In an exemplary aspect of the invention, transmit data streams requested by the various offload drivers 203, 205, 206, 207, and 208 may be combined so that long, multi-packet transmit requests may not starve, or delay, periodic short or single packet transmit requests. In this regard, a multi-level work-conserving scheduling system, such as system 200, may be utilized for assigning work to L2 /L4/L5 transmit processing. Accordingly, a scheduling controller may comprise tracking for a plurality of L2 /L4/L5 offload connections with active transmit requirements. The first level arbitration block may comprise multiple lists of grouped requests by a priority level, each organized as a round-robin scheme that may be utilized to independently select the next transmit requirement for each list. The second level arbitration block may comprise a work-conserving programmable weighted round-robin priority scheme that may be utilized to select amongst the transmit tasks selected by the first level priority scheme. The third level arbitration block may be utilized to limit duration of a single transmit task to a predetermined amount of data so that transmit behavior with good latency is accomplished. Additionally, the third level arbitration block may update associated connection context to reflect new state of transmit requirement.

A connection for the purposes of this invention defines a stream of TX buffer indications as generated by a single or multiple driver instances. Any driver instance may generate TX buffer indications for more than one connection. Connections may comprise, for example, L2 traffic streams generated by typical operating system protocol stacks as presented to a NIC by an L2 driver, L2 connection TX buffer indications may reference packets of a plurality of types and protocols. Multiple L2 connections may be generated by a driver to differentiate traffic transmit priority. Multiple L2 connections may be generated by a driver to differentiate host CPU affinity for multi-processing operating systems. Multiple L2 connections may also be used for other reasons. Another typical source of L2 connection traffic is management entities within the NIC, system or even remote from the system.

A plurality of L4 connections may be generated by an L4 driver, where each L4 connection may comprise transmit TX buffer indications for a particular offloaded L4 connection, for example a TCP offloaded connection. A typical source of L4 connections may be the operating system protocol stack or other system protocol stacks such as those used for storage. L4 connections may also be generated by management entities within the NIC, system or remotely from the system. A plurality of L5 connections may be generated by an L5 driver, where each L5 connection may comprise transmit TX buffer indications for a particular offloaded L5 connection, such as RDMA, iSCSI, or other L5 offloaded connection. A single driver may also generate connections of different offload types. For example, a single driver may generate connections of L2, L4, and/or L5 offload type without impacting the operation of a system in accordance with the invention.

A priority characteristic may be derived from a transmit TX buffer indications affinity to a connection of a specific offload type. For example, RDMA L5 connection transmits may desire different treatment than iSCSI L5 connection transmits. A priority characteristic may be derived from a transmit TX buffer indications affinity to a particular type of similar offload. For example, telnet TCP L4 offload transmits may desire different treatment than FTP (File Transfer Protocol) L4 offload transmits. A priority indication may also be derived from configuration or user input or from an OS or from IP TOS bits or from IEEE 802.1Q setting or from affinity to say management traffic, such as ASF, IPMI, and/or UMP in OS present or absent conditions.

Figure 3A:
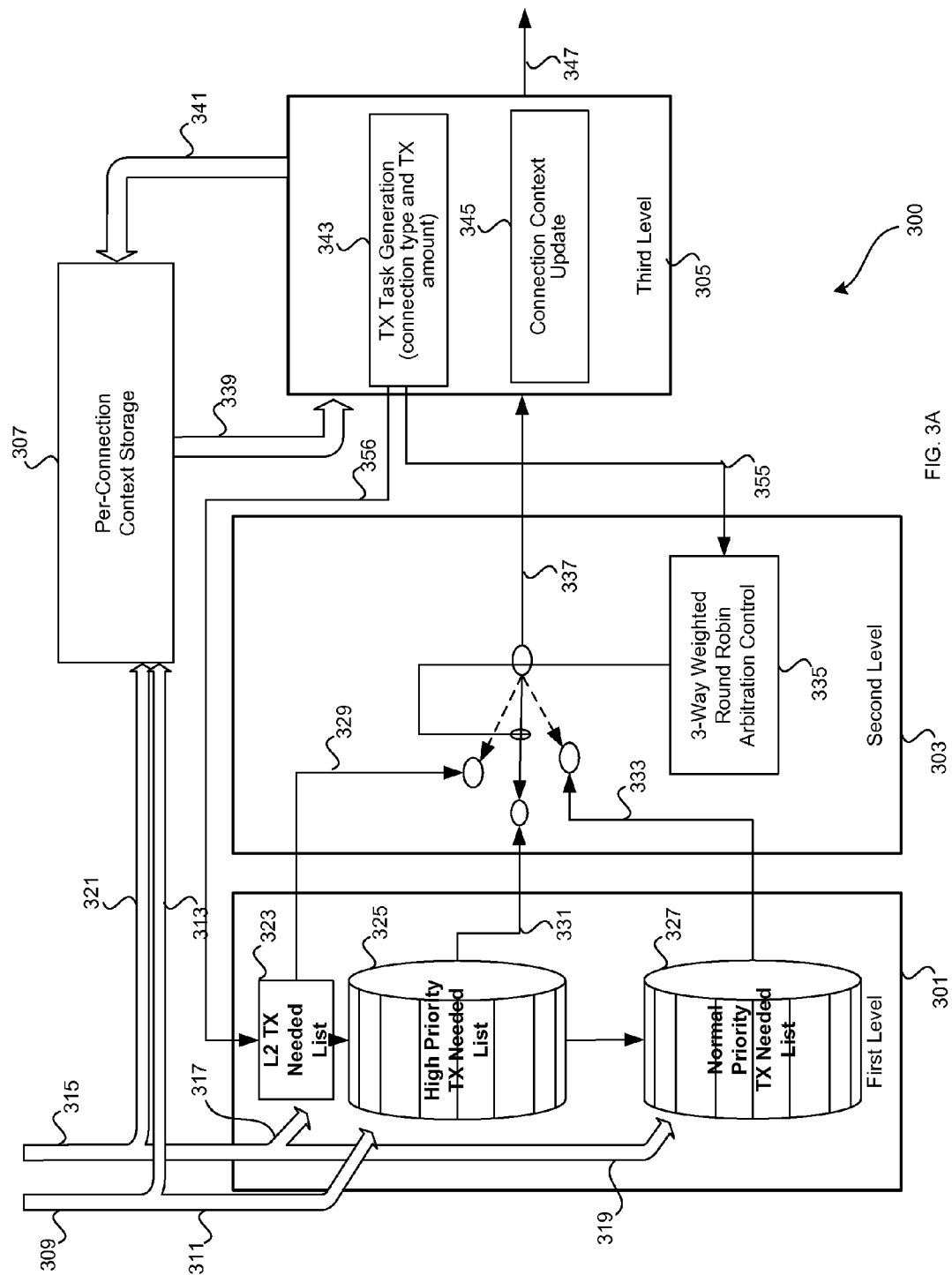
FIG. 3A is a block diagram of an exemplary prioritization scheme with a 3-way weighted round robin that may be utilized in a transmit scheduler element in the system of FIG. 2, for example, in accordance with an embodiment of the present invention.

FIG. 3A is a block diagram of an exemplary prioritization scheme with a 3-way weighted round robin that may be utilized in a transmit scheduler element in the system of FIG. 2, for example, in accordance with an embodiment of the present invention. Referring to FIG. 3A, the exemplary prioritization scheme 300 may comprise a first level arbitration block 301, a second level arbitration block 303, a third level arbitration block 305, and a per-connection context storage 307. The first level arbitration block 301 may comprise a plurality of lists of connections with transmit (TX) buffer indications. For example, the first level arbitration block 301 may comprise an L2 TX needed list 323, a high priority TX needed list 325, and a normal priority TX needed list 327. Each of the lists 323, 325, and 327 may specify connections that may require transmit operations of a similar priority characteristic and/or a particular connection type.

The second level arbitration block 303 may comprise a 3-way weighted round robin arbitration control block 335 and may be utilized to select which of the three connections selected by the first level task may be sent to the third level arbiter via connection 337. The third level arbitration block 305 may comprise a TX task generation block 343 and a connection context update block 345. The third level arbitration block 305 may be utilized to process the connection selected by the second level and may limit the amount of transmit, as well as updating the current transmit status of the connection. The third level arbitration block 305 may also modify the programming of the second level arbiter via path 355 based on accumulated traffic history of one or more priority classes so that a specific priority class is limited to a programmable percentage of TX bandwidth.

In operation, the process of selecting a connection that is ready for transmission, referred to as a transmit-ready connection, within a system utilizing a NIC and the exemplary prioritization scheme 300 may be initiated with requests from a plurality of drivers, such as a L2 driver, a L4 driver, or a L5 driver, on-NIC drivers, and/or remote drivers, for example. The drivers may request additional TX buffers to be transmitted by the NIC, TX buffer indicators may be initially received via the communication path 315. More specifically, depending on the connection type and/or priority characteristic of the TX buffer indication, TX buffer indicators may be routed to a corresponding list of connections, such as the L2 TX needed list 323 via the communication path 317. Similarly, TX buffer indicators relating to L4 or L5 (L4/L5) offload connections be received by the normal priority TX needed list 327 via the communication path 319. in addition to indicating the existence of new transmit-ready connections to the first level scheduler 301, the magnitude of each new transmit request may also be forwarded to the connection context associated with each connection in the per-connection context 307 via connection 321.

A second source of TX buffer indicators may be from a on-NIC source such as the receive (RX) path due to reception of data on a connection. As data is received, in order to maintain efficient transmit and receive bandwidth with minimal latency, acknowledge (ACK) packets may be scheduled for transmission and then transmitted for the connection. Requested TX buffer indicators for TX ACK message generation may be received via the communication path 309. More specifically, TX buffer indicators for TX ACK messages may be routed to the correct list of connections based on connection type or a priority characteristic of the TX buffer indication. For example, TX buffer indicators relating to L4/L5 offload may be received by the high priority TX needed list 325 via the communication path 311. The magnitude of each TX buffer indication for TX ACK message generation may be forwarded to the connection context associated with each connection in the per-connection context 307 via 313. Per-connection context information for each connection which is stored on the per-connection storage 307 may comprise a TX ACK message type and/or the amount of receive data to acknowledge and/or the extent of the transmit-ready data size. Also included in the context may be the current progress on transmission of transmit-ready data and/or status of the amount of data a connections receiver can accept and/or congestion control limitations associated with a connection and/or a maximum amount of transmit-ready data that may fairly be generated by a connection prior to allowing another connection to transmit.

In one aspect of the present invention, the first level arbitration block 301 may be utilized to search and find the next transmit-ready connection of each connection list, such as the L2 TX needed list 323, the high priority TX needed list 325, and/or the normal priority TX needed list 327, for example The first level arbitration block 301 may be adapted to select connections which may be operated on (e.g., transmit-ready connections). The transmit request may be made to the second level arbitration block 303. Within the first level arbitration block 301, the L2 TX needed list 323 may be adapted to track whether transmission of L2 level packets is needed. A single bit, or a plurality of bits, may be serviced in a round robin fashion in order to track L2 connections with similar priority with L2 transmit-ready packets. Any number of L2 streams may be supported with each stream utilizing only a single bit to track need for transmit, the L2 TX needed list 323 may be realized by utilizing flip-flops, for example. Further, multiple L2 connections with dissimilar priority characteristics may be implemented as separate L2 TX needed lists.

In an exemplary embodiment of the invention, an L2 application driver on a host may instruct a NIC utilizing the prioritization scheme 300 to transmit twenty more L2 packets, for example. An L2 TX needed list bit may then be set in 323 to indicate that there is some transmit activity needed. The magnitude of the transmit requirement indicating the value "20" is forwarded to the context associated with the L2 stream in 307 via 321. The fact that the bit is set may indicate that an L2 packet is ready for transmission, and the content of the context entry, i.e., twenty, may indicate how many L2 packets are ready for transmitting, i.e., twenty L2 packets are transmit-ready. Multiple L2 connections may be used each with it's associated bit in 323 and context entry in 307. In addition, L2 connections may be removed from each list when the third level arbiter 304 determines that transmit activity is complete for a connection.

In another embodiment of the invention, the high priority TX needed list 325 and the normal priority TX needed list 327 may be similar to each other as both lists may be adapted to service L4 and/or L5 offload connection traffic. The number of these blocks may be selected to match the number of different priority characteristics, for example, which may be desired for all the L4/L5 connections. These lists may indicate what connection is the next transmit-ready connection of L4 and/or the L4 offload type that is transmit-ready. Connections may be added to each list as TX buffer indications or ACK indications arrive. In addition, connections may be removed from each list when the third level arbiter 304 determines that transmit activity is complete for a connection.

The normal priority TX needed list 327 may be required to manage a lot more connections compared to the L2 TX needed list 323. Each bit in the normal priority TX needed list 327 may be associated with a specific L4 and/or L5 connection. A bit-positional scheme may be utilized for L4 and L5 traffic where, if a specific bit is set, then the position of the set bit within the normal priority TX needed list 327 may be indicative that the L4 or L5 connection in the host with the same number is ready for transmit. For example, if bit number five is set, it may be indicative that L4/L5 connection number five in the host is in the normal priority TX needed list 327 and ready for transmitting.

The high priority TX needed list 325 may be utilized to elevate the priority of at least a portion of transmit-ready connections. Connections on a NIC may be associated with transmitting and/or receiving data. For a specific connection, which is associated with receiving data, a TCP ACK message may be transmitted back to the transmitting NIC with high priority and prior to further transmitting other data. In a different embodiment of the present invention, a transmitting NIC may utilize a "floating window" scheme, or credit scheme, together with the transmit scheduler scheme 300, to allow better utilization of all the available transmit floating window. A TX ACK message sent promptly by a receiving NIC, for example, may keep the "transmit window" open and the connection efficient. In addition, providing faster updates on the window status allows bandwidth to be increased without having to enlarge the "transmit window" size. In yet a different embodiment of the present invention, the high priority TX needed list 325 may utilize a different type of application level control message during communications with a receiving NIC in order to maintain efficient bandwidth and minimal signal latency, for example iSCSI, R2T and status messages, and/or RDMA read request messages.

In another embodiment of the present invention, the first level arbitration block 301 may be implemented utilizing a random access memory (RAM) where at least a portion of the bits in the RAM may indicate a need for a connection to transmit. The bit position within the RAM may be utilized to identify the connection. A search algorithm may be provided and utilized for selecting the next connection to transmit by searching the RAM for bits of, for example, value of '1' or other value that may be utilized to indicate when a connection is ready to transmit. When processing for that connection has been requested, scanning may resume and the algorithm may continue searching for the next RAM bit with a value of '1', or other value that may be utilized to indicate when a connection is ready to transmit Further, different priority levels may be implemented where multiple bits are used to represent the transmit need for a single connection, such that a particular bit encoding may indicate that the single connection may be a member of a particular TX needed list and not a member of any other TX needed list. In this implementation, the memory and the scanning resources of the arbitration block 301 may be implemented in a single design, The first level arbitration block 301 may also be implemented as a linked-list, The transmit order of any transmit-ready connections may be determined by simply walking or traversing the linked-list of pointers and transmitting on each connection found. Pointers may be utilized to traverse the linked-list. Notwithstanding, other round-robin, weighted round-robin, or even FIFO arbitration schemes may be utilized in the first level arbitration block 301 without impacting the various benefits provided by the multi-layer NIC operation in accordance with the invention.

The L2 TX needed list 323, the high priority TX needed list 325, and the normal priority TX needed list 327 may be connected via the communication paths 329, 331, and 333, respectively, to the 3-way weighted round robin arbitration control block 335 in the second level arbitration block 303.

Each of the plurality of TX needed lists 323, 325, and 327 may present its selected connection to the second level arbitration block 303. The output of each TX needed list may be viewed as a connection that may require transmit activity of a determined traffic level and/or type. The definition of the traffic level, or type, may be determined by how the TX buffer indications were sorted into the various TX needed lists.

The 3-way weighted round-robin arbitration control block 335 may comprise suitable circuitry, logic and/or code and may be programmable so that it may select any of the TX buffer indicators received via the communication paths 329, 331, and/or 333. The selection criteria in the 3-way weighted round-robin arbitration control block 335 may be pre-programmed or dynamically changed. For example, a maximum percentage of transmit bandwidth may be used by L2 connections. For example, it may be pre-programmed that two out of every ten selected transmit-ready connections be of L2 type, thus providing no more than 20% of the transmit bandwidth be used by L2 type traffic assuming other traffic is using the bandwidth. The weighted round-robin for the second level may be adapted to be "work conserving" and, in this regard, any one of the first level arbitration sources may utilize all, or an additional portion, of the TX bandwidth if no other first level arbitration source is active.

The second level arbitration block 303 may be viewed as being able to divide the transmit bandwidth into a number of "buckets" or bins. Each bucket or bin may be assigned a traffic level, or type, which may, for example comprise L2 normal priority and high priority, corresponding to the TX needed lists provided in 301. The second level priority scheme may operate on each of the buckets, or bins, in a round-robin fashion, servicing the connection presented by the TX needed list assigned to the particular bucket. If an empty bucket is encountered where the assigned TX needed list has no connections with transmit requirements, the bucket or bin may be skipped and the next bucket or bin operated on in a work-conserving manner, so that all the transmit bandwidth may be taken by connections from a single TX Needed list, if the other TX needed lists are not active.

The second level arbitration may comprise a programmable register, for example, and may be adapted to facilitate L2, high priority, and low priority traffic mix to be balanced prior to transmission in the third level arbitration block 305. The bucket, or bin, scheme may allow the mix to be varied based on desired performance of L2 vs. L4/L5 offloads, while still prioritizing high priority ACK transmissions over other traffic. The bucket, or bin, scheme may also limit the latency experienced by either L2 or L4/L5 traffic since it prevents either class from fully occupying the transmit bandwidth and starving the other traffic. Providing two levels of priority for the L4/L5 connections in the first level arbitration block 301 allows specific connections to temporarily be elevated in priority, essentially skipping to the front of the normal level round-robin line. This may be suitable for prompt generation of ACK messages for TCP, or other transport protocols, to quickly advertise the ability of the NIC to accept more data for a specific connection. By designing additional TX needed lists, the bucket scheme may be utilized to provide different classifications of L2, L4, and/or L5 traffic so that each classification may be mixed at a controllable ration with other classifications of L2, L4, and/or L5 traffic. As shown, different connections types may share the same traffic classification to limit design complexity.

The second level arbitration programming may also be modified by the third level arbitration 305 via path 355 such that second level arbitration 303 may take true transmit bandwidth utilized by a traffic class into account when trying to balance transmit traffic between traffic classes. For example, a number of the buckets programmed to select a particular TX needed list may be modulated when transmit traffic of a certain traffic class exceeds a specific threshold.

The third level arbitration block 305 may be adapted to determine how much of a transmit-ready connection data to transmit at a given time. The third level arbitration block 305 may comprise a TX task generation block 343 and a connection context update block 345. In operation, connections selected by the weighted round robin arbitration block 335 may be communicated to the third level arbitration block 305 via the communication path 337. For each connection received by the third level arbitration block 305, context information may be read by the TX task generation block 343 from the per-connection context storage 307 via the communication path 339.

The per-connection context storage 307 may comprise on-chip or off-chip memory that may be adapted to store information identifying a type of connection, associated ACK message requirement, extent of available data to transmit, and a maximum limit(s) of data (how much can be, or is allowed to be, transmitted), for example. The context information may indicate selected transmit-ready connection type, as well as current TX requirements for that transmit-ready connection. The TX task generation block 343 may then utilize a set of rules, for example, to determine if transmission is possible for the selected connection. If transmission is possible, the TX task generation block 343 may determine how much data from the selected connection may be transmitted at one time (i.e., all data or a portion of data). The TX task generation block 343 may determine whether the selected connection may be "dequeued" from the first level arbitration TX needed lists 323, 325, and/or 327 via connection 356, for example. If a selected transmit-ready connection is transmitted in its entirety, the respective connection may be removed from the lists in the first level arbitration block 301.

If a connection data is longer than a maximum pre-determined length as specified in the context for example, the connection data may be segmented and only a portion of the connection data may be transmitted. The request for transmission of the specified amount of data is forwarded to the transmit processing via path 347. The connection context in the per-connection storage block 307 may be updated via the communication path 341 so that the third level arbitration block 305 may identify the remaining data for transmission when the connection arrives again via 337. In an embodiment of the present invention, the third level arbitration block may base its decision on how much data may be transmitted on how much data the receiver at the other end of the connection may be adapted to accept, and/or may currently accept, as well as connection congestion avoidance limits, as well as any other criteria, such as a per-TX task limit, or a maximum connection length limit, or any other protocol limits on transmission.

If a protocol requirement has been reached, or all the connection traffic has been transmitted, the third level arbitration block 305 may indicate to the first level arbitration block 301 to mark the connection as idle via path 356 by removing the connection from the various TX needed lists. Notwithstanding, the third level arbitration block 305 may decrement its outstanding transmit data by the amount requested via connection 347 and acquire the next connection that may require transmit via connection 337. This breaking up or segmentation of large transmit requests may prevent a particularly busy connection from fully occupying the transmit bandwidth. In this regard, at least some of the other active connections may be given a chance to transmit before returning to a connection that has a large amount of data to transmit. This limiting of transmit size on each operation generated at connection 347 may provide added control to the bin values in the 3-way weighted round robin arbitration control in the second level arbitration block 303. If a particular connection is transmitting a large amount of data in one request, the transmit size limiting may limit the transmission so that the ratio of bin values for a particular traffic class may be more accurate with respect to the actual transmit traffic.

Figure 3B:
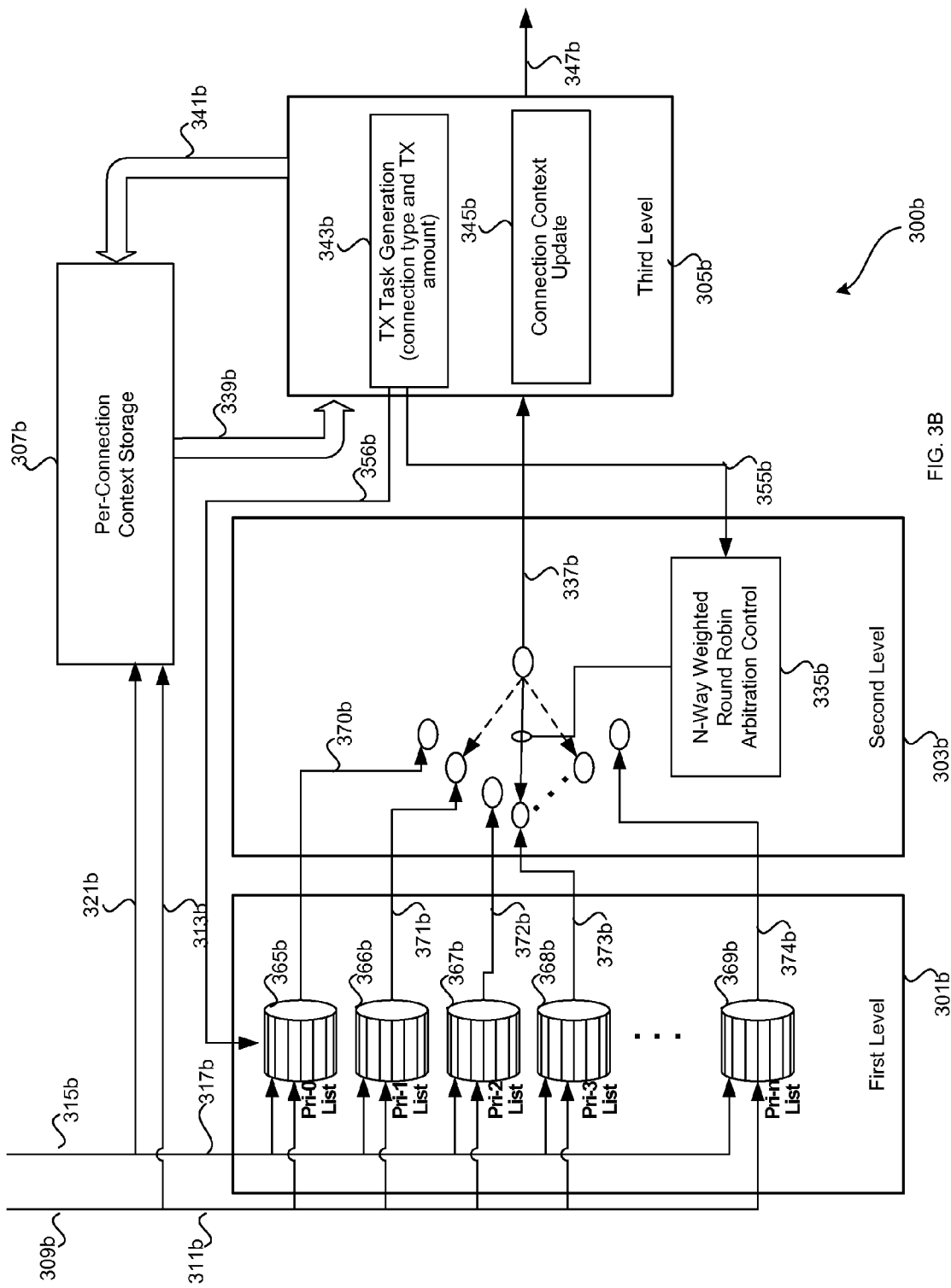
FIG. 3B is a block diagram of an exemplary prioritization scheme with an N-way weighted round robin that may be utilized in a transmit scheduler element in the system of FIG. 2, for example, in accordance with an embodiment of the present invention.

During operation of the exemplary prioritization scheme 300, any one connection may be prevented from fully occupying the transmit bandwidth and may be limited to utilizing a fair share of the transmit bandwidth. This may be guaranteed by the pre-programmed transmit length limit (which may be stored as a context information in the per-connection context storage 307) and the round-robin nature of the first level arbitration block 301. This feature may be advantageous since connections with light traffic may require short transmit latency regardless of the existence of other connections with large sustained transmit traffic. In instances where no other connections may have transmit traffic in a system utilizing the prioritization scheme 300, an active connection may not be limited and may have the capability to transmit at the rate permitted by the medium. This may be provided by the work-conserving nature of the second level arbitration block 303. This advantage is important for maintaining top performance for a small number of connections, such as a single connection, FIG. 3B is a block diagram of an exemplary prioritization scheme with an N-way weighted round robin that may be utilized in a transmit scheduler element in the system of FIG. 2, for example, in accordance with an embodiment of the present invention, Referring to FIG. 3B, the exemplary prioritization scheme 300b may comprise a first level arbitration block 301b, a second level arbitration block 303b, a third level arbitration block 305b, and a per-connection context storage 307b. The first level arbitration block 301b may comprise N number of priority lists, 365b through 369b, of connections with transmit (TX) buffer indications. Each of the plurality of lists 365b through 369b may specify connections that may require transmit operations of a similar priority characteristic and/or a particular connection type.

The second level arbitration block 303b may comprise an N-way weighted round robin arbitration control block 335b and may be utilized to select which of the N number of connections selected by the first level task may be sent to the third level arbiter 305b via connection 337b. The third level arbitration block 305b may comprise a TX task generation block 343b and a connection context update block 345b. The third level arbitration block 305b may be utilized to process the connection selected by the second level and may limit the amount of transmit, as well as updating the current transmit status of the connection. The third level arbitration block 305b may also modify the programming of the second level arbiter via path 355b based on accumulated traffic history of one or more priority classes so that a specific priority class is limited to a programmable percentage of TX bandwidth.

In operation, the process of selecting a connection that is ready for transmission, referred to as a transmit-ready connection, within a system utilizing a NIC and the exemplary prioritization scheme 300b may be initiated with requests from a plurality of drivers, such as a L2 driver, a L4 driver, a L5 driver, an on-NIC driver, or a remote driver, for example. Each driver may be adapted to generate connection traffic at various levels of offload on behalf of various operating system stacks, applications, and/or management entities. The drivers may request additional TX buffers to be transmitted by the NIC, TX buffer indicators for the plurality of priority lists 365b through 369b may be initially received via the communication path 315b. More specifically, depending on the connection type and/or priority characteristic of the TX buffer indication, TX buffer indicators may be routed to a corresponding priority list of connections, such as priority lists 365b through 369b via the communication path 317b. In addition to indicating the existence of new transmit-ready connections to the first level scheduler 301b, the magnitude of each new transmit request may also be forwarded to the connection context associated with each connection in the per-connection context 307b via connection 321b.

A second source of TX buffer indicators may be from an on-NIC source such as the receive (RX) path due to reception of data on a connection. As data is received, in order to maintain efficient transmit and receive bandwidth with minimal latency, acknowledge (ACK) packets, or other transmit tasks, may be scheduled for transmission and then transmitted for the connection. Requested TX buffer indicators for TX ACK message generation may be received via the communication path 309b. More specifically, TX buffer indicators for TX ACK messages may be routed to one or more priority lists of connections, such as the priority lists 365b through 369b, based on connection type and/or a priority characteristic of the TX buffer indication. The magnitude of each TX buffer indication for TX ACK message generation may be forwarded to the connection context associated with each connection in the per-connection context storage 307b via connection 313b. Per-connection context information for each connection, which is stored on the per-connection storage 307b, may comprise a TX ACK message type and/or the amount of receive data to acknowledge and/or the extent of the transmit-ready data size. Also included in the context may be the current progress on transmission of transmit-ready data and/or status of the amount of data a connections receiver can accept and/or congestion control limitations associated with a connection and/or a maximum amount of transmit-ready data that may fairly be generated by a connection prior to allowing another connection to transmit. Routing of TX buffer indicators to specific priority lists may be statically or dynamically configured and may be based on, for example, connection type, connection priority characteristic, and/or transmit protocol task type as specified by the TX buffer indicators.

The N number of priority lists 365b through 369b may be connected via the communication paths 370b through 374b, respectively, to the N-way weighted round robin arbitration control block 335b in the second level arbitration block 303b. Each of the plurality of priority lists 365b through 369b may present its selected connection to the second level arbitration block 303b. The output of each priority list may be viewed as a connection that may require transmit activity of a determined traffic level and/or type. The definition of a traffic level, or type, may be determined by how the TX buffer indications were sorted into the various TX needed lists.

The N-way weighted round-robin arbitration control block 335b may comprise suitable circuitry, logic and/or code and may be programmable so that it may select any of the TX buffer indicators received via the communication paths 370b through 374b. The selection criteria in the N-way weighted round-robin arbitration control block 335b may be pre-programmed or dynamically changed. For example, it may be pre-programmed that two out of every ten selected transmit-ready connections be of the type held in priority 0 connection list 365b, thus providing no more than 20% of the transmit bandwidth be used by connections in connection list 365b assuming other traffic is using the remaining bandwidth. The N-way weighted round-robin arbitration control 335b for the second level arbitration block 303b may be adapted to be "work conserving" and, in this regard, any one of the first level arbitration sources may utilize all, or an additional portion, of the TX bandwidth if other first level arbitration sources are not consuming all of the allowed bandwidth.

The second level arbitration block 303b may be viewed as being able to divide the transmit bandwidth into a number of "buckets" or bins. Each bucket, or bin, may be assigned a traffic level, or type, which may, correspond to the definition of the N number of priority lists 365b through 369b provided in the first level arbitration block 301b. The second level priority scheme may operate on each of the buckets, or bins, in a round-robin fashion, servicing the connection that may be presented by the priority list assigned or selected by the particular bucket. If an empty bucket is encountered where the assigned or selected priority list has no connections with transmit requirements, the bucket or bin may be skipped and the next bucket or bin operated on in a work-conserving manner, so that all the transmit bandwidth may be taken by connections from a single priority list, if the other priority lists are not active.

The second level arbitration programming may also be modified by the third level arbitration 305b via path 355b such that second level arbitration 303b may take true transmit bandwidth utilized by a traffic class into account when trying to balance transmit traffic between traffic classes. For example, a number of the buckets programmed to select a particular TX needed list may be modulated when transmit traffic of a certain traffic class exceeds a specific threshold.

The third level arbitration block 305b may be adapted to determine how much of a transmit-ready connection data to transmit at a given time. The third level arbitration block 305b may comprise a TX task generation block 343b and a connection context update block 345b. In operation, connections selected by the N-way weighted round robin arbitration block 335b may be communicated to the third level arbitration block 305b via the communication path 337b. For each connection received by the third level arbitration block 305b, context information may be read by the TX task generation block 343b from the per-connection context storage 307b via the communication path 339b.

The per-connection context storage 307b may comprise on-chip or off-chip memory that may be adapted to store information identifying a type of connection, associated ACK message requirement, extent of available data to transmit, and a maximum limit(s) of data (how much can be, or is allowed to be, transmitted), for example. The context information may indicate selected transmit-ready connection type, as well as current TX requirements for that transmit-ready connection. The TX task generation block 343b may then utilize a set of rules, for example, to determine if transmission is possible for the selected connection. If transmission is possible, the TX task generation block 343b may determine how much data from the selected connection may be transmitted at one time (i.e., all data or a portion of data). The TX task generation block 343b may determine whether the selected connection may be "dequeued" from the first level arbitration priority lists 365b through 369b via connection 356b, for example. If a selected transmit-ready connection is transmitted in its entirety, the respective connection may be removed from the lists in the first level arbitration block 301b.

If a connection data is longer than a maximum pre-determined length as specified in the context for example, the connection data may be segmented and only a portion of the connection data may be transmitted. The request for transmission of the specified amount of data is forwarded to the transmit processing via path 347b. The connection context in the per-connection storage block 307b may be updated via the communication path 341 b so that the third level arbitration block 305b may identify the remaining data for transmission when the connection arrives again via connection 337b. In an embodiment of the present invention, the third level arbitration block may base its decision on how much data may be transmitted on how much data the receiver at the other end of the connection may be adapted to accept, and/or may currently accept, as well as connection congestion avoidance limits, as well as any other criteria, such as a per-TX task limit, or a maximum connection length limit, or any other protocol limits on transmission.

If a protocol requirement has been reached, or all the connection traffic has been transmitted, the third level arbitration block 305b may indicate to the first level arbitration block 301b to mark the connection as idle via path 356b by removing the connection from the various TX needed lists. Notwithstanding, the third level arbitration block 305b may decrement its outstanding transmit data by the amount requested via connection 347b and acquire the next connection that may require transmit via connection 337b. This breaking up or segmentation of large transmit requests may prevent a particularly busy connection from fully occupying the transmit bandwidth. In this regard, at least some of the other active connections may be given a chance to transmit before returning to a connection that has a large amount of data to transmit. This limiting of transmit size on each operation generated at connection 347b may provide added control to the bin values in the N-way weighted round robin arbitration control 335b in the second level arbitration block 303b. if a particular connection is transmitting a large amount of data in one request, the transmit size limiting may limit the transmission so that the ratio of bin values for a particular traffic class may be more accurate with respect to the actual transmit traffic.

During operation of the exemplary prioritization scheme 300b, any one connection may be prevented from fully occupying the transmit bandwidth and may be limited to utilizing a fair share of the transmit bandwidth. This may be guaranteed by the pre-programmed transmit length limit (which may be stored as a context information in the per-connection context storage 307b) and the N-way round-robin nature of the first level arbitration block 301b. This feature may be advantageous since connections with light traffic may require short transmit latency regardless of the existence of other connections with large sustained transmit traffic. In instances where no other connections may have transmit traffic in a system utilizing the prioritization scheme 300b, an active connection may not be limited and may have the capability to transmit at the rate permitted by the medium. This may be provided by the work-conserving nature of the second level arbitration block 303b. This advantage is important for maintaining top performance for a small number of connections, such as a single connection.

In an exemplary aspect of the invention, a transmit scheduler within a L2/L4/L5 NIC, such as the transmit scheduler 210 of FIG. 2, may be implemented utilizing the exemplary prioritization scheme 300 or 300b illustrated in FIG. 3A or FIG. 3B, respectively.

Figure 4:
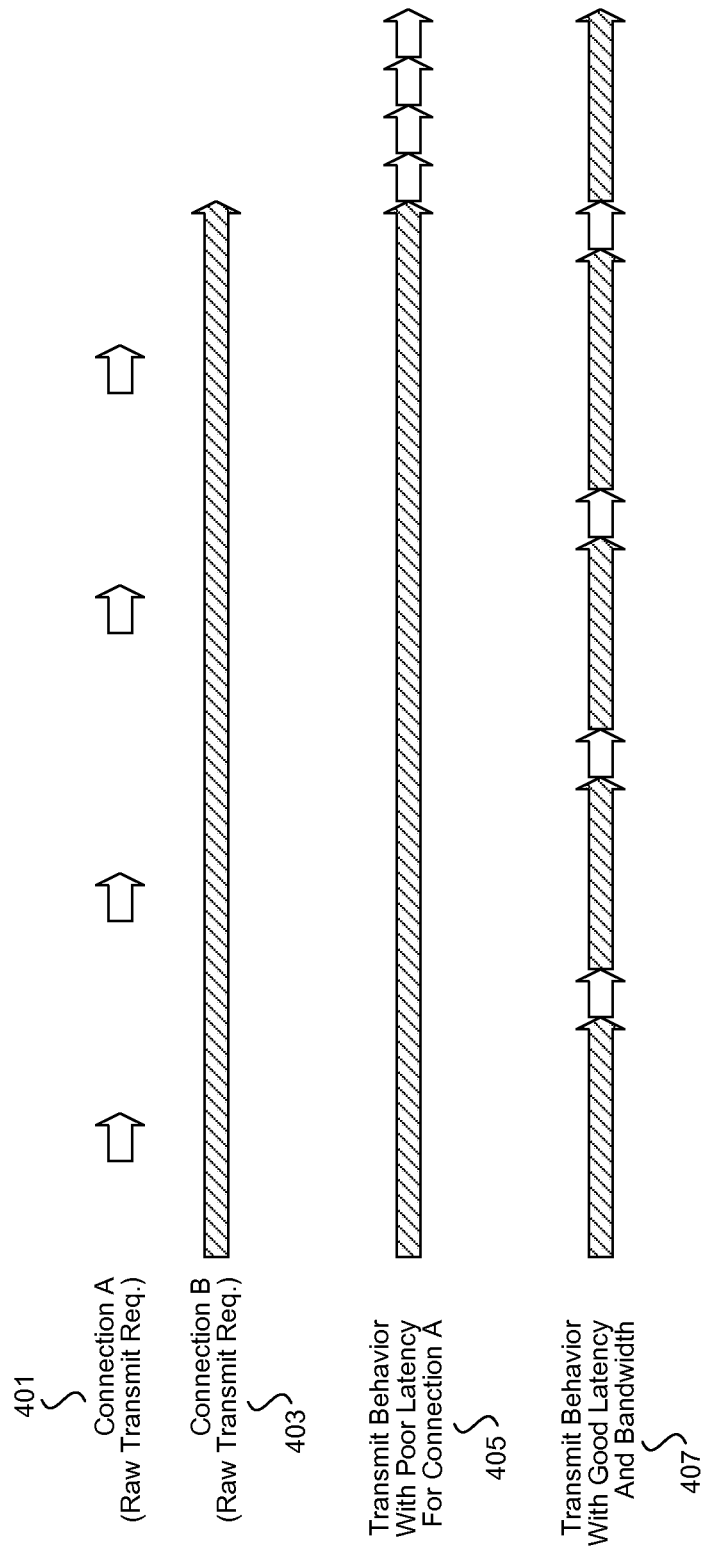
FIG. 4 is a diagram illustrating transmit behavior characteristic of the system of FIG. 2, in accordance with an embodiment of the present invention.

FIG. 4 is a diagram illustrating transmit behavior characteristic of the system of FIG. 2, in accordance with an embodiment of the present invention. Referring to FIG. 4, there is shown a connection A 401, a connection B 403, a transmit behavior 405 for connections 401 and 403, and transmit behavior 407 for connections 401 and 403 Connection A, 401, may have a small amount of data to transmit at periodic intervals and connection B, 403, may have a large amount of data to transmit. In an implementation without the benefit of the invention, such as the exemplary prioritization scheme 300 illustrated in FIG. 3, the transmit behavior 405 illustrates high latency for connection 401 since connection 401, with a small amount of data to transmit, may have to wait until the busier connection 403 is idle before connection 401 may be allowed to transmit. In a system utilizing a prioritization scheme in accordance with the present invention, transmit behavior with low latency may be achieved, as indicated by the graph 407. Low latency for connection 401, as well as efficient bandwidth utilization, may be achieved by transmitting only segments of data from connection 403 by utilizing the prioritization scheme.

In an exemplary aspect of the invention, any class of connection or single elements of a connections protocol may be prioritized taking into account transmit load information from other connection types. TCP ACK transmissions may be allocated a specific amount of minimum bandwidth for both L4 TCP offloads and L5 iSCSI offloads regardless of the transmit needs of L2 offload transmits of large UDP packets, for example. In this manner, the drawbacks of multiple interface conventional systems where each NIC may not have information regarding the transmit requirements of other offloads, such as the conventional system of FIG. 1A, may be avoided, By placing the transmit scheduler in front of a transmit processing engine, a single transmit processing engine capable of generating L2, L4, and/or L5 offload traffic at a rate allowed by the medium, may also generate a mix of L2, L4, and/or L5 offload traffic at the rate allowed by the medium.

Figure 5:
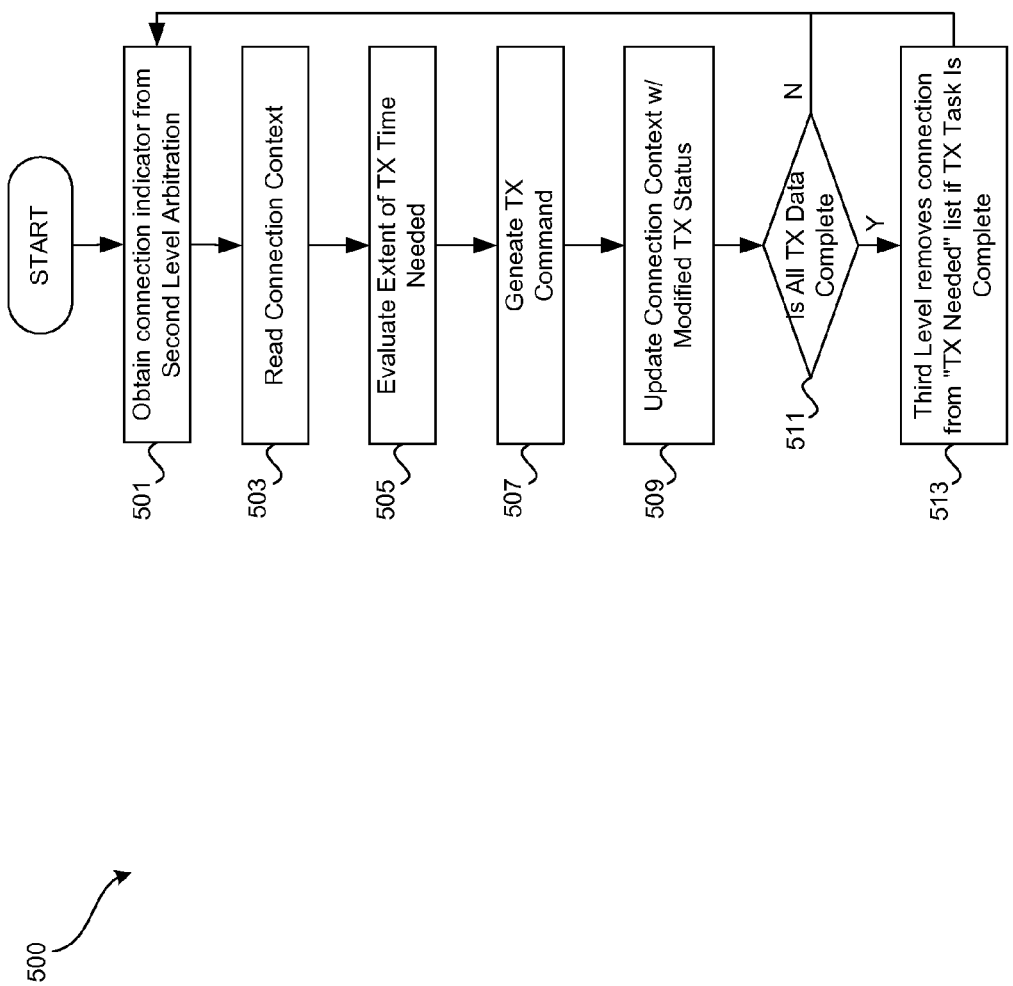
FIG. 5 is a flow diagram illustrating a method for transmit scheduling for multi-layer NIC operation, in accordance with an embodiment of the present invention.

FIG. 5 is a flow diagram illustrating a method 500 for transmit scheduling for multi-layer NIC operation, in accordance with an embodiment of the present invention. The method 500 may be implemented in an arbitration block, such as the third level arbitration block 305 of FIG. 3A or 305b of FIG. 3B. Referring now to FIG. 5, at 501, an indicator for a transmit-ready connection may be obtained from a second level arbitration block, such as arbitration block 303 in FIG. 3A or 303b in FIG. 3B. At 503, the context information associated with the selected transmit-ready connection may be read from a per-connection context storage block. The extent of transmit time for the specific transmit-ready connection may then be evaluated at 505. Evaluation may include limiting transmit to transmit requested by the driver, limiting transmit due to length limit for fair transmission and/or limiting transmit due to availability of buffer at the receiver and/or limiting transmit due to congestion avoidance and/or limiting transmit due to other protocol transmission requirements.

At 507 a transmit command may be generated effectuating transmittal of the selected connection for the amount determined in step 505. At 509, the connection context associated with the transmitted connection may be updated. For example, the context may be updated to reflect that the entire connection has been transmitted, or a segment of the connection has been transmitted. In an exemplary aspect of the invention, it may be possible that no change to the context may be needed, if the connection was prevented from transmission for protocol reasons. At 511, it may be determined whether all transmit data in the selected connection has been transmitted or if the protocol requires that transmission be suspended for this connection. If not, then a next connection may be obtained from the second level arbitration block, at 501. If all transmit data in the selected connection has been transmitted or if the protocol requires that transmission be suspended, then, at 513, a third level arbitration block may ask the first level arbitration block to remove the connection from the various priority lists.

Figure 6:
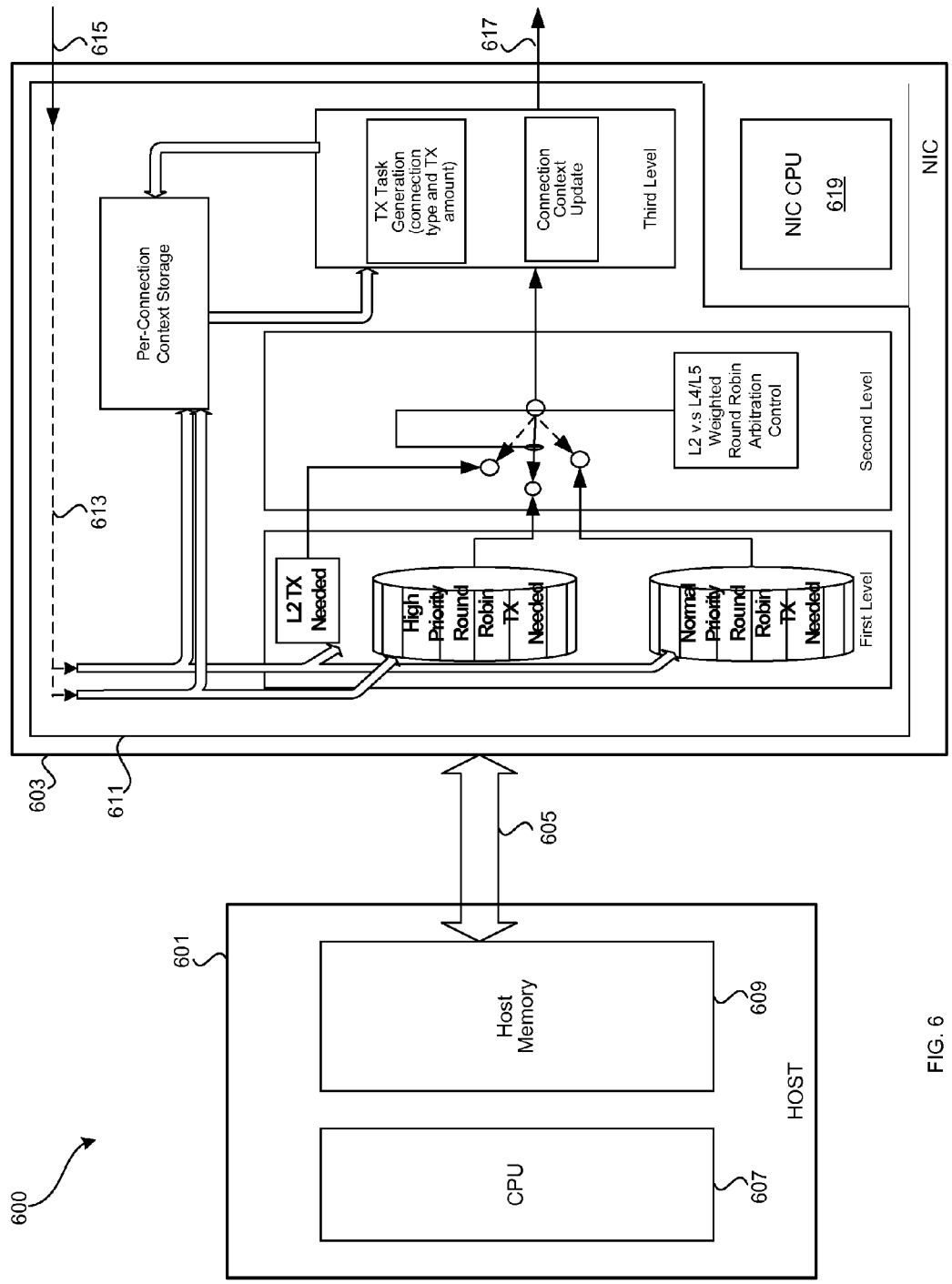
FIG. 6 is a block diagram of an exemplary system that may be utilized in connection with transmit scheduling for multi-layer NIC operation, in accordance with an embodiment of the present invention.

FIG. 6 is a block diagram of an exemplary system 600 that may be utilized in connection with transmit scheduling for multi-layer NIC operation, in accordance with an embodiment of the present invention. Referring to FIG. 6, the system 600 may comprise a host 601 and a NIC 603 The host 601 may comprise a processor (CPU) 607 and a host memory 609. The host memory 609 may be communicatively coupled to the NIC 603 via an interface bus 605. The NIC 603 may comprise a plurality of NIC CPU 619. In addition, the NIC 603 may utilize a prioritization scheme block 611 in accordance with an embodiment of the present invention. The NIC 603 may transmit data via a transmit path 617 and may receive data via a receive path 615. In one embodiment of the present invention, the receive path 615 may be coupled to the prioritization scheme block 611 via the communication path 613. The communication path 613 may be utilized for communicating TX ACK message requests, for example. In a different embodiment of the present invention, the NIC 603 may be part of the host 601.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing network data, the method comprising:
collecting by a network interface controller (NIC), a plurality of transmit (TX) buffer indicators into a plurality of priority lists of connections, wherein each of said plurality of TX buffer indicators identifies transmit-ready data located externally to said NIC and not previously received by said NIC;
selecting one or more of said plurality of TX buffer indicators;
retrieving said identified transmit-ready data into said NIC based on said selected one or more of said plurality of TX buffer indicators; and
transmitting at least a portion of said identified transmit-ready data.

2. The method according to claim 1, wherein each of said plurality of priority lists of connections is generated based on a particular connection priority characteristic and a particular connection type.

3. The method according to claim 1, wherein said identified transmit-ready data is associated with a same connection priority characteristic and a same connection type.

4. The method of claim 2, wherein said particular connection type comprises one or more of a level 2(L2 ) type, a level 4 (L4) type, or a level 5 (L5) type.

5. The method of claim 4, comprising, if said particular connection type comprises said L2 type, said L4 type, or said L5 type, prioritizing one or more of said plurality of TX buffer indicators into at least one of said plurality of priority lists of connections with at least one particular connection priority characteristic.

6. The method of claim 5, comprising prioritizing said plurality of priority lists of connections based on at least one particular connection priority characteristic.

7. The method of claim 6, wherein one or more of said plurality of priority lists of connections is utilized to elevate transmission priority of one or more of a TCP acknowledge (ACK) message, a session layer ACK message, or a protocol element.

8. The method of claim 1, wherein one or more of said plurality of priority lists of connections is utilized to limit transmission bandwidth dedicated to at least one type of traffic or a protocol element.

9. The method of claim 1, wherein one or more of said plurality of TX buffer indicators is selected via a weighted round robin scheme.

10. The method of claim 1, comprising associating one or more of said plurality of TX buffer indicators with at least one context information.

11. The method of claim 6, wherein one or more of said plurality of priority lists of connections is utilized to guarantee low latency transmission to one or more of a type of traffic, a connection, or a protocol element.

12. The method of claim 10, wherein said at least one context information comprises one or both of an ACK extent requirement or a maximum transmit-ready data size.

13. The method of claim 12, comprising, if data size of said identified transmit-ready data is greater than said maximum transmit-ready data size, segmenting said identified transmit-ready data into a plurality of transmit-ready data segments, each of said plurality of transmit-ready data segments being smaller than said maximum transmit-ready data size.

14. The method of claim 13, comprising transmitting said plurality of transmit-ready data segments of a particular connection type.

15. The method of claim 14, wherein at least a portion of said plurality of transmit-ready data segments is separated by another identified transmit-ready data from a connection associated with at least one of a particular connection priority characteristic or said particular connection type.

16. A non-transitory computer-readable storage medium having stored thereon, a computer program having at least one code section for processing network data for network interface controller (NIC) applications, said at least one code section being executable by a computer for causing said computer to perform steps comprising:
collecting by said NIC, a plurality of transmit (TX) buffer indicators into a plurality of priority lists of connections, wherein each of said plurality of TX buffer indicators identifies transmit-ready data located externally to said NIC and not previously received by said NIC;

selecting one or more of said plurality of TX buffer indicators;

retrieving said identified transmit-ready data into said NIC based on said selected one or more of said plurality of TX buffer indicators; and transmitting at least a portion of said identified transmit-ready data.

17. The non-transitory computer-readable storage medium of claim 16, wherein each of said plurality of priority lists of connections is generated based on a particular connection priority characteristic and a particular connection type.

18. The non-transitory computer-readable storage medium of claim 16, wherein said identified transmit-ready data is associated with a same connection priority characteristic and a same connection type.

19. The non-transitory computer-readable storage medium of claim 17, wherein said particular connection type comprises one or more of a level 2 (L2) type, a level 4 (L4) type, or a level 5 (L5) type.

20. The non-transitory computer-readable storage medium of claim 19, wherein said at least one code section comprises code for prioritizing one or more of said plurality of TX buffer indicators into at least one of said plurality of priority lists of connections with at least one particular connection priority characteristic, if said particular connection type comprises said L2 type, said L4 type, or said L5 type.

21. The non-transitory computer-readable storage medium of claim 20, wherein said at least one code section comprises code for prioritizing said plurality of priority lists of connections based on at least one particular connection priority characteristic.

22. The non-transitory computer-readable storage medium of claim 21, wherein one or more of said plurality of priority lists of connections is utilized to elevate transmission priority of one or more of a TCP acknowledge (ACK) message, a session layer ACK message, or a protocol element.

23. The non-transitory computer-readable storage medium of claim 21, wherein one or more of said plurality of priority lists of connections is utilized to limit transmission bandwidth dedicated to at least one type of traffic or a protocol element.

24. The non-transitory computer-readable storage medium of claim 16, wherein one or more of said plurality of TX buffer indicators is selected via a weighted round robin scheme.

25. The non-transitory computer-readable storage medium of claim 16, wherein said at least one code section comprises code for associating one or more of said plurality of TX buffer indicators with at least one context information.

26. The non-transitory computer-readable storage medium of claim 21, wherein one or more of said plurality of priority lists of connections is utilized to guarantee low latency transmission to one or more of a type of traffic, a connection, or a protocol element.

27. The non-transitory computer-readable storage medium of claim 26, wherein said at least one context information comprises one or both of an ACK extent requirement or a maximum transmit-ready data size.

28. The non-transitory computer-readable storage medium of claim 27, wherein said at least one code section comprises code for segmenting said identified transmit-ready data into a plurality of transmit-ready data segments, each of said plurality of transmit-ready data segments being smaller than said maximum transmit-ready data size, if data size of said identified transmit-ready data is greater than said maximum transmit-ready data size.

29. The non-transitory computer-readable storage medium of claim 28, wherein said at least one code section comprises code for transmitting said plurality of transmit-ready data segments of a particular connection type.

30. The non-transitory computer-readable storage medium of claim 29, wherein at least a portion of said plurality of transmit-ready data segments is separated by another identified transmit-ready data from a connection associated with at least one of a particular connection priority characteristic or said particular connection type.

31. A system for processing network data, the system comprising:

one or more processors, one or more circuits, or any combination thereof within a network interface controller (NIC), said one or more processors, one or more circuits, or any combination thereof enables collecting by said NIC, a plurality of transmit (TX) buffer indicators into a plurality of priority lists of connections, wherein each of said plurality of TX buffer indicators identifies transmit-ready data located externally to said NIC and not previously received by said NIC;

said one or more processors, one or more circuits, or any combination thereof enables selecting of one or more of said plurality of TX buffer indicators;

said one or more processors, one or more circuits, or any combination thereof enables retrieving of said identified transmit-ready data into said NIC based on said selected one or more of said plurality of TX buffer indicators; and said one or more processors, one or more circuits, or any combination thereof enables transmitting at least a portion of said identified transmit-ready data.

32. The system according to claim 31, wherein each of said plurality of priority lists of connections is generated based on a particular connection priority characteristic and a particular connection type.

33. The system according to claim 31, wherein said identified transmit-ready data is associated with a same connection priority characteristic and a same connection type.

34. The system of claim 32, wherein said particular connection type comprises one or more of a level 2 (L2) type, a level 4 (L4) type, or a level 5 (L5) type.

35. The system of claim 34, wherein said one or more processors, one or more circuits, or any combination thereof enables prioritizing one or more of said plurality of TX buffer indicators into at least one of said plurality of priority lists of connections with at least one particular connection priority characteristic, if said particular connection type comprises said L2 type, said L4 type, or said L5 type.

36. The system of claim 35, wherein said one or more processors, one or more circuits, or any combination thereof enables prioritizing said plurality of priority lists of connections based on at least one particular connection priority characteristic.

37. The system of claim 36, wherein one or more of said plurality of priority lists of connections is utilized to elevate transmission priority of one or more of a TCP acknowledge (ACK) message, a session layer ACK message, or a protocol element.

38. The system of claim 36, wherein one or more of said plurality of priority lists of connections is utilized to limit transmission bandwidth dedicated to at least one type of traffic or a protocol element.

39. The system of claim 31, wherein one or more of said plurality of TX buffer indicators is selected via a weighted round robin scheme.

40. The system of claim 31, wherein said one or more processors, one or more circuits, or any combination thereof enables associating one or more of said plurality of TX buffer indicators with at least one context information.

41. The system of claim 36, wherein one or more of said plurality of priority lists of connections is utilized to guarantee low latency transmission to one or more of a type of traffic, a connection, or a protocol element.

42. The system of claim 41, wherein said at least one context information comprises one or both of an ACK extent requirement or a maximum transmit-ready data size.

43. The system of claim 42, wherein said one or more processors, one or more circuits, or any combination thereof enables segmenting said identified transmit-ready data into a plurality of transmit-ready data segments, each of said plurality of transmit-ready data segments being smaller than said maximum transmit-ready data size, if data size of said identified transmit-ready data is greater than said maximum transmit-ready data size.

44. The system of claim 43, wherein said one or more processors, one or more circuits, or any combination thereof enables transmitting said plurality of transmit-ready data segments of a particular connection type.

45. The system of claim 44, wherein at least a portion of said plurality of transmit-ready data segments is separated by another identified transmit-ready data from a connection associated with at least one of a particular connection priority characteristic or said particular connection type.

\* \* \* \* \*